United States Patent [19]
Livingston et al.

[11] 3,881,978
[45] May 6, 1975

[54] METHOD OF FORMING A POLYESTER PREIMPREGNATED FIBERGLASS SHEET

[75] Inventors: Everett L. Livingston, Easley; James M. Kring, Hampton, both of S.C.

[73] Assignee: Westinghouse Electric Corporation, Pittsburgh, Pa.

[22] Filed: Mar. 11, 1974

[21] Appl. No.: 450,274

[52] U.S. Cl. .............. 156/247; 156/181; 156/278; 156/324; 161/194; 161/231; 161/DIG. 4; 264/136; 264/258
[51] Int. Cl. ............................................. B32b 31/00
[58] Field of Search .......... 156/180, 181, 222, 228, 156/247, 278, 289, 324; 264/136, 137, 258; 117/140 R; 161/156, 194, 195, 231, 233, 403, 406, DIG. 4, 140, 143

[56] References Cited
UNITED STATES PATENTS

| | | | |
|---|---|---|---|
| 3,163,689 | 12/1964 | Ives | 156/179 X |
| 3,615,979 | 10/1971 | Davis | 161/194 X |
| 3,718,527 | 2/1973 | Goodman | 156/180 X |

*Primary Examiner*—William A. Powell
*Attorney, Agent, or Firm*—D. P. Cillo

[57] ABSTRACT

A polyester composition, having about 30 to 65 weight percent flame resistant filler, about 0.2 to 5 weight percent of a thickening agent and an amount of hardener effective to catalyze the composition at temperatures over about 100°C, is coated onto and compacted into a fiber mat at about room temperature, to a weight ratio of filled polyester: fiber mat of about 3:1 to 1:1, and allowed to thicken for at least 4 hours so that its viscosity is over 10,000,000 cps at 25°C to provide a polyester preimpregnated fibrous sheet.

9 Claims, 1 Drawing Figure

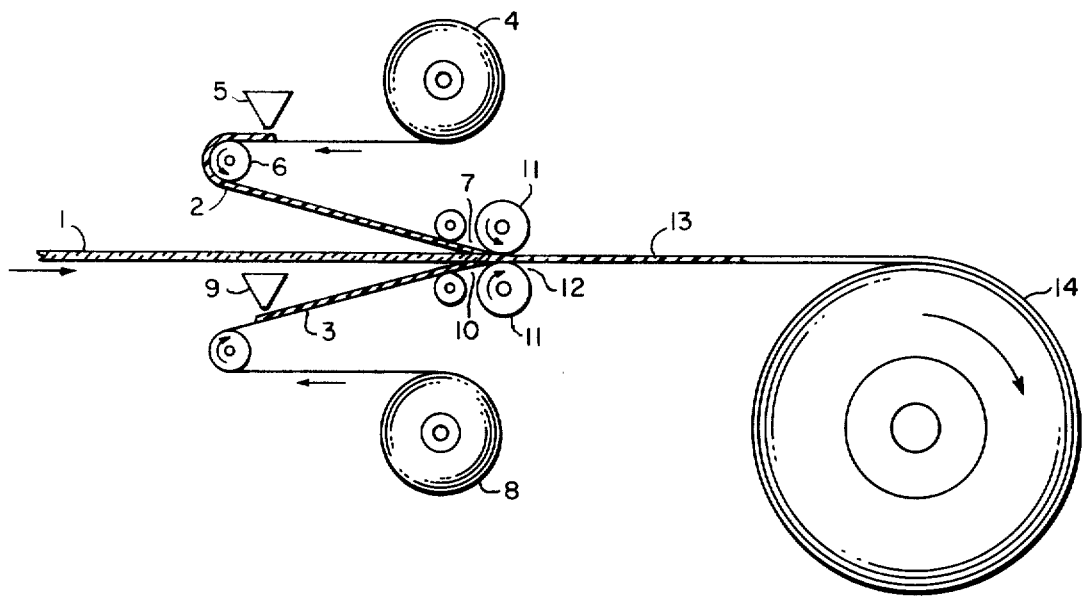

3,881,978

METHOD OF FORMING A POLYESTER PREIMPREGNATED FIBERGLASS SHEET

BACKGROUND OF THE INVENTION

Polyester resins are known for their chemical resistance and toughness, and have been used as the base resins for filled, low viscosity, compositions used to coat and impregnate glass mat to form a "preform". The preform, containing fluid resin, is then cured by application of heat and pressure between closed metal molds, such as in Fischer, U.S. Pat. No. 3,184,527, and Fingerhut, U.S. Pat. No. 2,688,580. It has been difficult to use heavy filler loadings in these processes, due to the need for a highly flowable resin composition.

Such processes do not always provide a homogeneous composition, and many times foreclose the use of various materials such as polyethylene powder flexibilizers which tend to float to the top of the resin when used in conditional molding processes. With the present stressing of fire retardant and arc resistant properties of polyester laminates, it is necessary to use a high loading of flame resistant filler such as alumina trihydrate. Therefore, a method is needed which will allow impregnating glass mats with highly loaded, homogeneous, polyester-filler compositions; to provide a mat containing a thickened resin composition having a long shelf life, which can be subsequently stacked and laminated in an open press at high pressure, with minimal resin flow, to produce a smooth surface laminate with few voids and minimal loss of resin.

SUMMARY OF THE INVENTION

We have found that adding about 0.2 to 5 weight percent thickener to a composition containing about 30 to 50 weight percent polyester resin, about 2 to 10 weight percent reactive diluent, about 30 to 65 weight percent flame resistant filler, and about 0.2 to 3 weight percent hardener that will catalyze the composition only at temperatures over about 100°C, will provide a homogeneous polyester resinous composition. This composition will thicken within a continuous fiberglass mat at room temperature, after room temperature coating and pressure compacting into the mat, to form a composition with a viscosity over about 10,000,000 cps, at 25°C. This will provide a flame resistant, highly filled, polyester impregnated mat, which, if the weight ratio of filled polyester: fiber mat is between about 3:1 to 1:1, can be subsequently laminated in an open press at temperatures over 125°C with minimal resin flow, to produce a smooth surface laminate substantially free of surface irregularities.

BRIEF DESCRIPTION OF THE DRAWINGS

For a better understanding of the invention, reference may be made to the preferred embodiment, shown in the accompanying drawing, which shows the preferred method of coating and compacting of this invention.

DESCRIPTION OF THE PREFERRED EMBODIMENTS

Polyester laminating resins are viscous materials of a low degree of polymerization well known in the art. They may be produced by the condensation reaction of a glycol with both an unsaturated and a saturated dicarboxylic acid. The term polyester resin, as used herein, refers to unsaturated polyester resin masses comprising organic polyhydric alcohol esters of carboxylic acids which are employed generally in combination with polymerizable ethylenically-unsaturated compounds such as styrene. The polyesters can be mixed with a variety of modifiers to impart specific properties and with reactive diluents such as methyl methacrylate, vinyl toluene, diallylphthalate, vinyl acetate, cyclopentadiene, allyl maleate but preferably styrene (vinylbenzene monomer) to ease working, enhance reactivity and reduce the cost of the polyester. In making the unsaturated polyester resins, propylene glycol, ethylene glycol and diethylene glycol are the most important glycols used and may be reacted with maleic acid or anhydride or fumaric acid, as the unsaturated acid. A saturated acid or anhydride may also be used, such as phthalic anhydride or adipic or azelaic acid, to reduce the intensity of cross-linking. A complete description of polyester resins may be found in *The Condensed Chemical Dictionary*, Rheinhold Pub. Co., 6th Ed., pp. 910–911 and *Plastic Materials*, J. S. Brydson (1966), pp. 431–450, both herein incorporated by reference.

Hardeners that may be used in the method of this invention must be effective to catalyze the system only at temperatures over about 100°C, and include tertiary butyl perbenzoate, benzoyl peroxide and dicumylperoxide. Since the method of this invention uses a thickening reaction at room temperature after filling of the mat and before pressure and heat laminating, room temperature catalytic hardeners such as methyl ethyl ketone peroxide-cobalt naphthenate and benzylperoxide are not useful. Thickeners that are compatible with the polyester resin system described above include calcium oxide and magnesium oxide and their mixtures. These must be added to the other ingredients in critical amounts after they have been mixed and just before coating the mat. The most useful flame resistant filler is alumina trihydrate ($Al_2O_3 \cdot 3H_2O$). The filler should have a particle size distribution between about 2 to 35 microns diameter in order to give good arc and track resistance. When particle sizes over about 35 microns are used, the resin will not properly wet and intimately mix with the particles.

The composition used in the method of this invention must be flame resistant, homogeneous, and have a capability of thickening ("B staging") to a composition having a viscosity over about 10,000,000 cps within about 4 hours at room temperature. Where the viscosity is below 10,000,000 cps, resin bleeding will occur during subsequent lamination to form the product board, and the surface will not be smooth and free of surface irregularities. The preferred laminating or molding viscosity, however, will range from about 40,000,000 to about 80,000,000 cps.

For about 25 to 50 parts polyester resin, which may contain polymerizable liquid monomers and suitable modifiers, about 30 to 65 parts flame resistant filler must be used to provide suitable fire retardant and arc resistant properties. Below 30 parts, the flame properties are marginal, and above 60 parts, the composition becomes a paste which would present difficult pressure application problems. The use of small effective amounts of reactive diluent, about 2 to 10 parts; thickener, about 0.2 to 5 parts; and catalyst, about 0.2 to 3 parts, per 25 to 50 parts polyester are also required for an effective, low flow, curable composition, having a viscosity of between about 18,000 and 30,000 cps at 25°C prior to thickening (B staging). All the ingredients except the thickener are mixed for a time effective to provide a homogeneous mixture, usually about 10 to 45 minutes depending on batch size. Then, just prior to the coating step, the critical amount of thickener is added, generally by pumping it into the system.

The highly filled polyester composition described above is coated onto and pressure applied or compacted into a continuous flame resistant mat such as suitably flame treated cloth or nylon, or preferably fiberglass mat. The glass mat can be in the form of glass cloth, continuous glass filament, or chopped strand mat, where glass filaments at least about 1 inch long are fixed by an insoluble resinous binder. Because of the increasing viscosity of the filled polyester composition between the coating and compacting steps, the glass mat fibers must be continuous or somehow fixed, to allow the composition to flow around the glass without unduly displacing the fibers when compacting pressure is applied. The glass fibers may have a suitable silane finish to provide a better bond between the inorganic glass fibers and the organic resin. In a typical treatment, vinyl trichlorsilane is hydrolyzed in the presence of the glass fibers and this condenses with hydroxyl groups on the surface of the glass. The binder materials that may be used include polyesters, starch and polyvinyl acetate among others. The weight ratio is filled polyester resin:fiber mat should range between about 3:1 to 1:1. A ratio below 1:1 would not provide adequate flame retardant properties and the surface of the subsequently laminated composite would be rough and uneven: a ratio above 3:1 would allow excessive flow bleeding during subsequent mold lamination. Since the composition is not completely cured until subsequent laminating, room temperature catalysts are not useful in this process.

Referring now to the drawing, a continuous method of making highly filled, thickened (B staged), polyester completely impregnated glass fiber "prepreg" mats, having minimal resin flow tendencies is shown. A fibrous mat 1, preferably made of glass cloth, continuous glass strands or fixed, long, chopped glass strands, is continuously fed between top and bottom polyester-filler coated sheets 2 and 3, wherein the coated surfaces are disposed in a manner facing each other, and the polyester-filler coating contacts and coats at least one side of the fixed fibrous mat which is fed between them, all advancing at the same rate of speed. The polyester-filler coating must be homogeneous, and adherable to the supporting sheets. The polyester-filler coating must be a composition having a viscosity between about 18,000 to 30,000 cps at 25°C, in order to properly adhere to the supporting sheets and allow flow into a fiber web.

In one method, a top roll 4 of plastic material, such as polyethylene sheet, is coated on its top surface with the composition of this invention by a suitable coating and metering means 5. The coated sheet is then reversed by a suitable means such as roller 6, so that the coating becomes the bottom surface of the sheet 2, which is disposed next to and coats one side of the continuously fed fibrous mat, as shown at position 7. A second bottom roll 8 of plastic material, disposed below the fibrous mat 1 and top roll 4, is coated on its top surface with the composition of this invention by a suitable coating and metering means 9. The sheet 3, coated side up, is then disposed next to and coats another side of the continuously fed fibrous mat, as shown at position 10. The top sheet, coated fibrous mat and bottom sheet are fed at the same rate of speed through a pressure or compacting means 11, such as a set or series of pressure rolls which exert pressure on the coated fiber mat. The pressure rolls operate at about 10 to 50 pounds of air pressure. The fibrous mat contacts coating on both sides, said coating being forced around the fibers and into the interior of the mat to completely fill it at position 12.

The composite 13, comprising top and bottom plastic material with sandwiched, filled fibrous mat disposed therebetween is rolled onto a take up reel 14, where the polyester filler composition is allowed to thicken and semi-cure (B stage), generally at least 4 hours and preferably between about 24 to 48 hours to a viscosity between about 10,000,000 to 80,000,000 cps. The composite then is unwound and the top and bottom plastic material sheets of the composite are easily peeled off by hand or other suitable means to provide highly filled polyester-styrene glass fiber mats which are relatively non-flowable at room temperature.

These mats must contain a filled resin composition having a viscosity of at least about 10,000,000 cps at 25°C, and a weight ratio of filled polyester resin: fiber mat of about 3:1 to 1:1. They provide a polyester prepreg for laminate production having minimal flow tendencies and a long shelf life, i.e. storage capability, of about 3 months before complete hardening. The long shelf life is due to the fact that the thickening reaction proceeds slowly after 10,000,000 cps is reached, and non-room temperature hardners are used in the method. The polyester prepreg can be cut into suitably sized sheets, at least two of them stacked on top of each other or stacked on top of other core layers, comprising for example epoxy or phenolic impregnated kraft or other suitable paper, to form a laminate stack up. The laminate stack up can then be molded under heat and pressure in a suitable open press, at for example 100° to 185°C and 200 to 1000 psi, without resin bleeding, to provide a non-flowable, smooth surface laminate. This laminate will have excellent consolidation, bonding, fire retardant and arc resistant properties, and an excellent surface appearance free of irregularities and free of excess resin due to little or no resin bleeding.

Of course the foregoing method can be varied somewhat as long as the polyester composition described is applied to a fiber mat and impregnated into the mat's interior, to a weight ratio of filled polyester resin: fiber mat of about 3:1 to 1:1 at room temperature, and is thickened at room temperature to a viscosity of at least 10,000,000 cps. The variations are considered within the broader scope of the method of this invention. For example, a simplified method, wherein coating and metering means 9 is eliminated, so that only coated sheet 2 coats the continuously fed glass mat at position 7 and the sheet from roll 8 is used only as a support, has been found particularly useful. The coating is then forced through the mat by compacting means 11 and gravity flows through the mat.

EXAMPLE 1

A resin composition was mixed containing: 1000 pounds, 43 wt%, of unsaturated polyester resin having a viscosity of 1,200 cps at 25°C (sold commercially by Koppers Corp. under the tradename 3701-25); 100 pounds, 4.3 wt%, styrene monomer reactive diluent; 800 pounds, 35 wt%, alumina trihydrate filler having a particle size distribution between about 6 to 8 microns diameter; 15 pounds, 0.65 wt%, tertiary butyl perbenzoate catalyst; 50 pounds calcium stearate mold release agent; 10 pounds red pigment and 200 pounds polyethylene powder as a flexibilizing agent. This composition was stirred for 30 minutes in a large tank to produce a homogeneous composition having a viscosity between about 20,000 to 25,000 cps at 25°C.

Fifty pounds, 2.2 wt%, calcium oxide as thickening agent was pumped into the mixture and the resin composition was immediately metered onto two sheets of polyethylene using a Finn and Fram 48 inches wide sheet molding compound machine similar to that shown in the drawing but with seven sets of press rollers. The polyethylene sheet was about 2 mils thick and the composition formed a coating about 1/32 inch thick. A 1/32 inch thick 4 foot wide continuous strand glass fiber mat weighing 1 ounce per square foot was fed on top of the resin of the bottom resin coated polyethylene sheet. The other polyethylene sheet was fed resin face down on top of the fiber mat. The sandwiched glass fiber mat was fed at about 10 ft./min. through a series of seven sets of rollers in the Finn and Fram molding compound machine. The rollers exerted an air pressure of about 10 pounds for the first set and about 50 pounds for the last set. The rollers forced the resin composition into the interior of the mat from both sides, to completely fill and compact it.

The composite was rolled onto a take-up reel and comprised continuous top and bottom plastic sheet with sandwiched impregnated fibrous mat disposed therebetween. After about 1 hour, the plastic sheet could be peeled from the composite. After about 4 hours the resin thickened to about 10,000,000 cps, but the composite was allowed to dry for about 24 hours to thicken the resin to about 40,000,000 cps. The top and bottom polyethylene sheets were then easily removed by hand to provide the thickened (B staged) polyester-styrene-glass fiber mat prepreg. Weight loading per four foot square was 284 grams, corresponding to a weight ratio of filled polyester resin to fiber mat of (284-114:114) = 1.5:1 or 60 wt% resin and 40 wt% glass fiber. This polyester prepreg had a shelf life of about 3 months. It differed from a preform in that a closed mold to contain resin flow was not necessary to heat and pressure consolidate laminates.

Two sheets of the impregnated mats were trimmed to 3 ft. squares and placed on top of each other in an open press between stainless steel plates. Calcium stearate coated aluminum foil, having a paper backing contacting the plates, were used as release sheets. The impregnated mats were laminated at 500 psi for about 10 minutes. The temperature was allowed to reach 140°C after which the mats were cooled in the press. The resulting unitary laminate had a thickness of one-sixteenth inch. The laminate had no noticeable defects. The surface was of high quality smoothness with no voids or unfilled surface areas. There was little or no resin bleeding or loss. The laminate was well bonded together and provided excellent dimensional tolerances.

EXAMPLE 2

A resin composition was mixed containing: 658 pounds of high reactive styrene type unsaturated polyester resin having a viscosity of 1,200 cps at 25°C (sold commercially by W. R. Grace and Co. under the tradename Marco GR-63003) and 161 pounds of reactive styrene type low shrinkage modifier having a viscosity of 3,000 cps at 25°C (sold commercially by W. R. Grace and Co. under the tradename Marco GR-630004), providing 37 wt% styrene modified polyester resin; 1232 pounds, 56 wt%, alumina trihydrate filler having a particle size distribution between about 6 to 8 microns diameter; 6 pounds, 0.3 wt%, tertiary butyl perbenzoate hardener; 50 grams, 2.5 wt%, styrene monomer reactive diluent; 24.5 pounds calcium stearate mold release agent; 5 pounds titanium dioxide white pigment and 15 pounds red pigment. This composition was stirred for 20 minutes to produce a homogeneous composition having a viscosity between about 20,000 to 25,000 cps at 25°C.

Then, 32.5 pounds of 30% solids magnesium oxide thickener, providing 10 pounds, 0.4 wt% of magnesium oxide as thickening agent, was pumped into mixture. The resin composition was immediately coated onto one thirty-second inch thick continuous strand glass fiber mats weighing 1 and 1½ ounces per square foot each, using only the top polyethylene sheet of a Finn and Fram 48 inches wide sheet molding compound machine similar to that shown in the drawing but with seven sets of press rollers. The process otherwise was similar to EXAMPLE 1. The following 4 foot square weights were produced, the weight of the mats being 114 and 170 grams respectively: 500 grams, 600 grams and 665 grams; corresponding to weight ratios of filled polyester resin to fiber mat of (500-170:170) = 1.9:1, 2.5:1 and 2.9:1 for the 1½ ounce/sq. ft. mat and 260 grams, 300 grams and 360 grams; corresponding to weight ratios of filled polyester resin to fiber mat of (260-114:114) = 1.3:1, 1.6:1, 2.2:1. The viscosity of the resin, after allowing it to thicken for 24 hours was over about 40,000,000 cps at 25°C.

It is important to add the thickener last, after complete homogenization of the other ingredients, so that minimal mixing will be required and the complete composition will maintain an 18,000 to 30,000 cps viscosity range during compacting the composition into the interior of the fibrous mat. Since the object is to produce a storable prepreg mat, room temperature catalysts are not useful. The catalysts used should only be effective at the subsequent molding temperature of about trade-name C.

To produce a 36 × 36 × 1/16 inch laminate, 2 sheets of the 600 grams impregnated mat were trimmed to 3 ft. squares and placed on top of each other in an open press between stainless steel plates using calcium stearate-aluminum release sheets. The impregnated mats were laminated at 750 psi for about 10 minutes. The temperature was allowed to reach 170°C, after which the mats were cooled in the press. The resulting unitary consolidated laminate had a thickness of 1/16 ± 0.005 inch, with the exception of 1 inch within the outer edges of the laminates, providing excellent dimensional tolerances. The surface was of high quality smoothness and there was little or no resin bleeding or loss, due to the viscosity and the resin: fiber loading of the resin:

The laminates were tested for flame properties with the following excellent results. ASTM-D-495 arc resistance = 187 seconds; ASTM-D-790 perpendicular dielectric strength = 500 volts/mil. They also passed U. L. Flame Resistance Test No. 492 and ASTM-D-229 Flame Resistant Test.

We claim as our invention:

1. A method of forming a non-flowable, filled, resinous, flame resistant sheet, comprising the steps of:
   A. homogeneously admixing
      1. about 30 to 50 weight percent of unsaturated polyester resin,
      2. about 2 to 10 weight percent of reactive diluent, selected from the group consisting of styrene, methyl methacrylate, vinyl toluene, diallyl phthalate, vinyl acetate, cyclopentadiene and allyl maleate,
      3. about 30 to 65 weight percent filler comprising alumina trihydrate, and
      4. an effective amount of hardener, effective to catalyze the admixture only at temperatures above about 100°C; and then
   B. adding to the admixture, about 0.2 to 5 weight percent of a thickener selected from the group consisting of calcium oxide, magnesium oxide and mixtures thereof, to provide a resinous composition having a viscosity between about 18,000 to 30,000 cps at 25°C; and then
   C. immediately coating the composition at about room temperature onto at least one surface of a fibrous mat of substantially fixed fibers; and then
   D. compacting the coated mat at about room temperature, to cause the composition to flow around the fibers of the mat and completely fill the mat; and then
   E. semi-curing the composition within the mat at about room temperature, by allowing the composition to thicken to a viscosity over about 10,000,000 cps at 25°C, said filled polyester composition having a weight ratio of resin composition to fiber of between about 3:1 to 1:1, to form a filled, resinous, flame resistant mat, containing a non-flowable, filled, polyester composition.

2. The method of claim 1 wherein the reactive diluent is styrene, the filler consists essentially of alumina trihydrate having a particle size between about 2 to 35 microns diameter, the fibrous mat is made of glass fibers, and the composition is semi-cured in step (E) by allowing it to thicken for at least 4 hours to a viscosity between about 10,000,000 to 80,000,000 cps.

3. The method of claim 2 wherein at least two filled, flame resistant mats are stacked up and laminated in an open press at a temperature above about 100°C and a pressure above about 200 psi, to provide a flame resistant, consolidated, bonded laminate having a surface substantially free of surface irregularities and excess resin.

4. The method of claim 3 wherein the admixture contains about 0.2 to 3 weight percent of a hardener selected from the group consisting of tertiary butyl perbenzotate, benzoyl peroxide and dicumyl peroxide.

5. The method of claim 3 wherein the coated mat is compacted by passing it through at least one set of rollers which exert a pressure on the coated fibrous mat.

6. A method of forming a flame resistant consolidated laminate, comprising the steps of:
   A. homogeneously admixing
      1. about 30 to 50 weight percent of polyester resin,
      2. about 2 to 10 weight percent of styrene,
      3. about 30 to 65 weight percent of alumina trihydrate filler having a particle size between about 2 to 35 microns diameter,
      4. about 0.2 to 3 weight percent of a hardener, effective to catalyze the admixture at temperatures of about 100°C, selected from the group consisting of tertiary butyl perbenzoate, benzoyl peroxide and dicumyl peroxide, and
      5. 0 to about 10 weight percent of a flexibilizer; and then
   B. adding to the admixture about 0.2 to 5 weight percent of a thickener selected from the group consisting of calcium oxide, magnesium oxide and mixtures thereof, to provide a resinous composition having a viscosity between about 18,000 to 30,000 cps at 25°C; and then
   C. immediately coating the composition at about room temperature onto at least one of two moving sheets of plastic material;
   D. feeding a glass fiber mat at the same rate of speed as and between the moving plastic sheets so that the coating contacts and coats at least one surface of the mat;
   E. feeding the composite of coated mat and top and bottom plastic sheets between at least one set of rollers, at about room temperature, which exert a pressure on the composite to compact the composite and cause the composition to flow around the glass fibers of the mat and completely fill the mat; and then
   F. feeding the composite onto a take-up reel; and then
   G. semi-curing the compsition within the mat at about room temperature, by allowing the composition within the mat to thicken for at least 4 hours from the time of compacting, to a viscosity between about 10,000,000–80,000,000 cps at 25°C, said filled polyester composition having a weight ratio of resin composition to glass fiber of between about 3:1 to 1:1, to form a filled, resinous, flame resistant mat containing a non-flowable filled polyester composition,
   H. unrolling the composite and stripping the top and bottom plastic sheets from the mat; and then
   I. placing at least two of the filled, flame resistant mats on top of each other and molding them in an open press, at a temperature above about 100°C and a pressure above about 200 psi, to provide a flame resistant, consolidated, bonded laminate, having a surface substantially free of surface irregularities and excess resin.

7. The method of claim 6 wherein the plastic materials coated in step (C) are polyethylene sheets.

8. The method of claim 6 wherein the top and bottom plastic sheets of the composite are not stripped until the composition is allowed to thicken for at least 4 hours.

9. The method of claim 6 wherein the composition is coated on the sheet of plastic material that contacts the top of the fiber mat.

* * * * *